Jan. 22, 1952  R. W. ESAREY  2,583,141
BEARING ASSEMBLY
Filed July 14, 1949
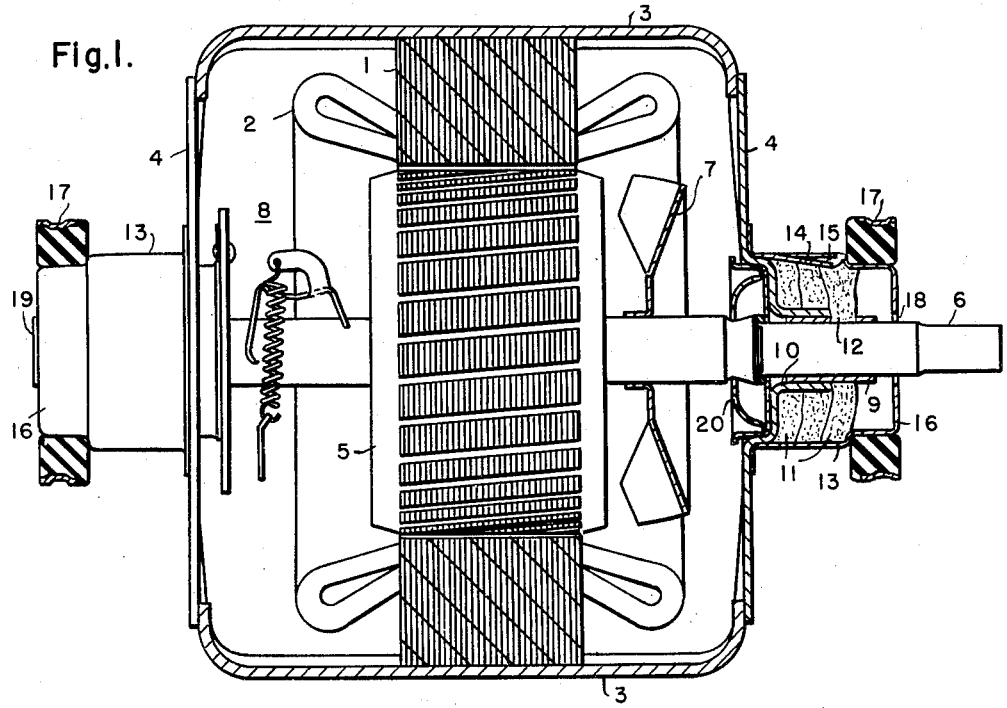
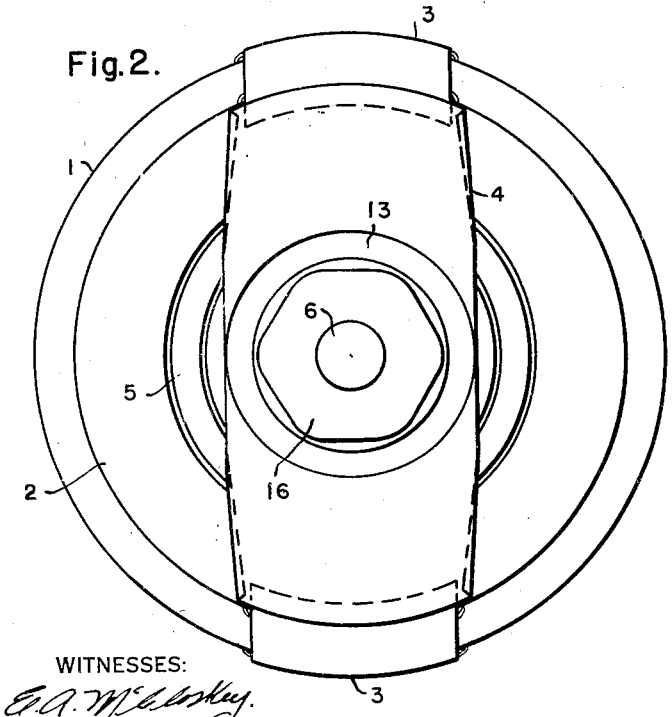
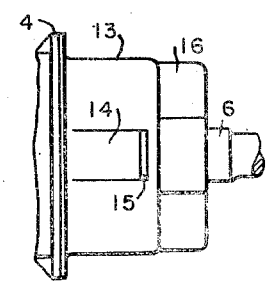
WITNESSES:
E.A. M?Closkey.
Leon M. Garman
INVENTOR
Raymond W. Esarey.
BY
ATTORNEY Patented Jan. 22, 1952

2,583,141

UNITED STATES PATENT OFFICE 2,583,141

BEARING ASSEMBLY

Raymond W. Esarey, Lima, Ohio, assignor to Westinghouse Electric Corporation, East Pittsburgh, Pa., a corporation of Pennsylvania Application July 14, 1949, Serial No. 104,687

4 Claims. (Cl. 308—132)

The present invention relates to bearing assemblies, and more particularly to an oil-lubricated, sleeve-type bearing assembly.

Sleeve-type bearings, such as are often used on fractional horse-power electric motors, are usually lubricated by means of oil-soaked wicking, which is packed around the bearing and held in place by means of a spring which presses the wicking into engagement with the shaft through a window in the bearing. In the usual construction, the wicking and spring are placed within an integral bearing boss or protuberance on the end bracket of the motor in which the bearing is mounted. With this arrangement, it is necessary in assembling the bearing to insert the wicking and spring into the bearing boss through a small opening, such as an oil hole. This is a difficult and time-consuming operation and often results in improper placement of the wicking and spring, which leads to inadequate lubrication and short bearing life. This conventional construction also usually requires a considerable amount of machining of the end bracket, which tends to increase the cost of the motor.

The principal object of the present invention is to provide a sleeve bearing assembly of simple and inexpensive construction.

Another object of the invention is to provide a sleeve bearing assembly which is easy to assemble, and in which the parts are automatically properly positioned during assembly.

A more specific object of the invention is to provide a sleeve bearing assembly in which the bearing is lubricated by means of oil-soaked wicking, which is contained in a housing member enclosing the bearing and having an integral portion bent down into engagement with the wicking to hold the wicking against the shaft, and to provide an opening for the addition of oil.

Other objects and advantages of the invention will be apparent from the following detailed description, taken in connection with the accompanying drawing, in which:

Fig. 1 is a longitudinal sectional view showing the bearing assembly of the present invention applied to an electric motor;

Fig. 2 is an end view of the motor and bearing assembly with the mounting rings omitted; and Fig. 3 is a top plan view of the bearing.

The invention is shown in the drawing embodied in the bearings of an electric motor of the skeleton construction disclosed and claimed in my copending application, Serial No. 99,438, filed June 16, 1949, and assigned to Westinghouse Electric Corporation. It is to be understood, however, that the invention is not restricted to this particular type of motor, but that the new bearing assembly is of general application wherever oil-lubricated sleeve bearings can be used.

The motor illustrated in the drawing has a laminated stator core 1 carrying primary windings 2. The core 1 has two longitudinal side supports 3 rigidly secured to it at diametrically opposite points, and transverse bearing support members 4 are rigidly secured to the longitudinal members 3 at opposite ends of the motor. The motor also has a rotor member 5 mounted on a shaft 6, and a fan 7 and speed-responsive switch 8 may also be mounted on the shaft 6 if desired or necessary.

The shaft 6 is supported in sleeve bearings 9 which are mounted in the bearing supports 4. The bearing assemblies are identical at both ends of the motor and only one will be described in detail. In the particular embodiment of the invention shown, each of the bearing supports 4 has a central axially extending tubular portion 10 formed integrally with the bearing support 4, and the bearing 9 is pressed into the tubular portion 10 and extends axially from it. The bearing supports 4 are elongated members, as shown in Fig. 2, extending between the longitudinal supports 3, and are adapted to be produced by drawing or forming in a press. It will be understood, however, that the invention is applicable to bearing supports of any type, such as the conventional round end brackets, or any other suitable supporting structure, and that the bearing 9 may be mounted in the bearing support in any suitable manner.

The bearing 9 is lubricated by means of a plurality of annular members or washers 11 of wicking which are placed over the tubular portion 10 and the bearing 9, the outermost of the washers 11 having a substantially D-shaped opening, so that it engages the shaft 6 through the window 12 of the bearing, in order to convey the lubricant directly to the surface of the shaft. The wicking washers 11 are enclosed and retained in position by a bearing housing member 13, which is a generally cylindrical or cup-shaped member, preferably made of sheet metal and secured to the bearing support 4 by spot welding, or in any other suitable manner. The housing 13 has an integral portion 14 of its upper side partially severed during the fabrication of the housing, and after the housing is assembled over the wicking, the portion 14 is bent down, as clearly shown in Fig. 1, to engage the wicking to apply a resilient pressure, or spring force in the radial direction to hold the wicking in engagement with the shaft 6 through the window 12. When the portion 14 of the housing is bent down, an opening 15 is formed which is large enough to allow the addition of oil to the wicking through the opening, thus providing an oil hole.

The outer end 16 of the bearing housing 13 may be of reduced diameter and is preferably formed to receive a resilient mounting ring 17, for resiliently mounting the motor to absorb vibration. In the illustrated embodiment, the end portion 16 of the housing is hexagonal in cross section, but it will be apparent that it may be made circular, or of other suitable polygonal configuration, to receive a mounting ring 17 of any desired type. The ring 17 may, of course, be omitted if resilient mounting is not desired. The outer end 16 of the bearing housing has a central circular opening 18 through which the shaft 6 passes at one end of the motor, the corresponding opening 18 in the bearing housing at the opposite end being closed by a cap 19. A bearing cap 20 of any suitable type is provided on the inside of the bearing support 4 to prevent leakage of oil from the bearing.

It should now be apparent that a bearing assembly has been provided which is of simple and inexpensive construction, and which can readily be assembled. Thus, the bearing 9 is first pressed into the tubular portion 10 of the bearing support 4, and the oil-soaked wicking washers 11 are placed over the bearing and tubular portion. The housing 13 is then placed over the wicking and welded to the bearing support 4, and the bearing cap 20 is pressed into place on the opposite side of the bearing support. The assembly is then completed by bending down the portion 14 of the housing 13 to apply resilient pressure to the wicking and to open the oil hole 15. The resilient mounting ring 17, if used, may be mounted on the housing 13 either before or after it is put in place. It is to be noted that this construction results in the parts being automatically positioned correctly, since the wicking is placed in position before the housing is put in place, and the portion 14, which applies spring pressure to the wicking, is an integral part of the housing and cannot be misplaced. It will also be noted that no machining is required for the bearing assembly itself, since all the parts can readily be produced by drawing or punching. Thus, a simple and inexpensive construction is provided, which gives equally effective and reliable lubrication of the bearing as the more complicated and expensive constructions which have previously been used.

A specific embodiment has been shown and described for the purpose of illustration, but it will be apparent that various modifications may be made within the scope of the invention, and it is to be understood, therefore, that the invention is not restricted to the particular details of construction shown, but in its broadest aspects it includes all equivalent embodiments and modifications which come within the scope of the appended claims.

I claim as my invention:

1. A bearing assembly comprising a support, a sleeve bearing mounted in said support, a housing member secured to the support and enclosing the bearing, wicking disposed in the housing member for lubricating the bearing, and said housing member having an integral, inwardly-projecting portion partially severed therefrom and bent inward to engage said wicking to apply radial pressure to the wicking and to provide an opening for supplying lubricant to the wicking.

2. A bearing assembly comprising a support, a sleeve bearing mounted in said support, a housing member secured to the support and enclosing the bearing, wicking disposed in the housing member for lubricating the bearing, and said housing member having an integral portion of the upper part thereof partially severed and bent inward to apply radial pressure to the wicking and to provide an opening for supplying lubricant to the wicking.

3. A bearing assembly comprising a support, said support having an extending tubular portion, a sleeve bearing mounted in said tubular portion, a generally cylindrical housing member secured to the support and enclosing the bearing, wicking disposed in the housing member for lubricating the bearing, and said housing member having a portion of the upper part thereof partially severed and bent inward to apply radial pressure to the wicking and to provide an opening for supplying lubricant to the wicking.

4. A bearing assembly comprising a support, said support having an extending tubular portion, a sleeve bearing mounted in said tubular portion, a generally cylindrical housing member secured to the support and enclosing the bearing, wicking disposed in the housing member for lubricating the bearing, and said housing member having a portion of the upper part thereof partially severed and bent inward to apply radial pressure to the wicking and to provide an opening for supplying lubricant to the wicking, the housing member also having an axially extending portion adapted to receive a mounting member.

RAYMOND W. ESAREY.

REFERENCES CITED

The following references are of record in the file of this patent:

UNITED STATES PATENTS

| Number | Name | Date |
|---|---|---|
| 2,175,887 | Fleicher | Oct. 10, 1939 |
| 2,462,172 | Esarey | Feb. 22, 1949 |